Sept. 15, 1953  
E. J. LIME  
2,652,176  
CREAM DISPENSING APPARATUS FOR COFFEE-MAKING  
AND DISPENSING MACHINES  
Filed Sept. 19, 1949  
2 Sheets-Sheet 1

INVENTOR.
Ermal J. Lime
BY
ATTORNEY.

Sept. 15, 1953  E. J. LIME  2,652,176
CREAM DISPENSING APPARATUS FOR COFFEE-MAKING
AND DISPENSING MACHINES
Filed Sept. 19, 1949  2 Sheets-Sheet 2

INVENTOR.
Ermal J. Lime
BY
ATTORNEY.

Patented Sept. 15, 1953

2,652,176

UNITED STATES PATENT OFFICE 2,652,176

CREAM DISPENSING APPARATUS FOR COFFEE-MAKING AND DISPENSING MACHINES

Ermal J. Lime, Kansas City, Mo., assignor to Lymean Manufacturing Co., Inc., Kansas City, Mo., a corporation of Missouri Application September 19, 1949, Serial No. 116,543

4 Claims. (Cl. 222—361)

1

This invention relates generally to a machine for automatically brewing and vending predetermined quantities of coffee or other beverages, the primary object being to improve upon such machine and particularly upon apparatus of the kind forming the subject matter of United States Letters Patent No. 2,433,054, dated December 23, 1947, in the name of Iola S. Lime, and entitled "Beverage Brewing and Vending Machine."

Through extensive tests and experimentations with the vending machine of the aforesaid patent, considerable difficulty has been experienced in the dispensing of measured quantities of cream. The patentee of said patent anticipated the association of sugar and cream dispensing elements with the coffee brewing and vending apparatus; and, therefore, the aforesaid experiments along that line have developed the problem of providing structure capable of preventing clogging or choking of the cream itself when the same takes a powdered form and within the storage receptacle therefor, as well as in the dispensing assembly.

It is the most important object of the present invention, therefore, to provide cream dispensing apparatus for coffee making and dispensing machines, whether or not the latter takes the form of that disclosed in the aforesaid patent, adaptable to handle granular materials of all kinds, such as powdered cream, and capable as the same operates to prevent choking and to release the powder for free flow whenever the tendency to clog or jam occurs.

Another important object of the present invention is to provide a dispenser for granular products having a reciprocable valve provided with a measuring chamber and operable to discharge predetermined quantities of the material during each cycle of operation, the valve itself having structure operable in conjunction with the outlet of the material at its source to agitate the same and thereby prevent choking.

A further object of the present invention is to provide a valve as above mentioned for moving measured quantities of granular material from an outlet opening of a material receptacle to a point of discharge, the valve having an auxiliary chamber for receiving and containing a quantity of the material disposed to move such last-mentioned material across the outlet opening each time the valve is reciprocated, whereby to utilize the material itself as a means to prevent choking.

Other important objects relate to the way in which the auxiliary compartment of the valve is spaced below the outlet opening to enhance the releasing action of the material; the way in which all passageways to the stored material are normally maintained closed to prevent collection of moisture; and the manner in which the material is agitated within the container itself each time the delivery valve is actuated. More minor objects, including details of construction of the container itself, will be made clear or become apparent as the following specification progresses, reference being had to the accompanying drawing, wherein:

While the cream dispensing apparatus forming the subject matter hereof and about to be described is adaptable for use in dispensing virtually any type of granular, powdery or comminuted materials and, further, since such apparatus may be used with various types of vending machines, the same has been particularly adapted for use in conjunction with a machine such as that shown in the aforesaid patent.

Figure 1:
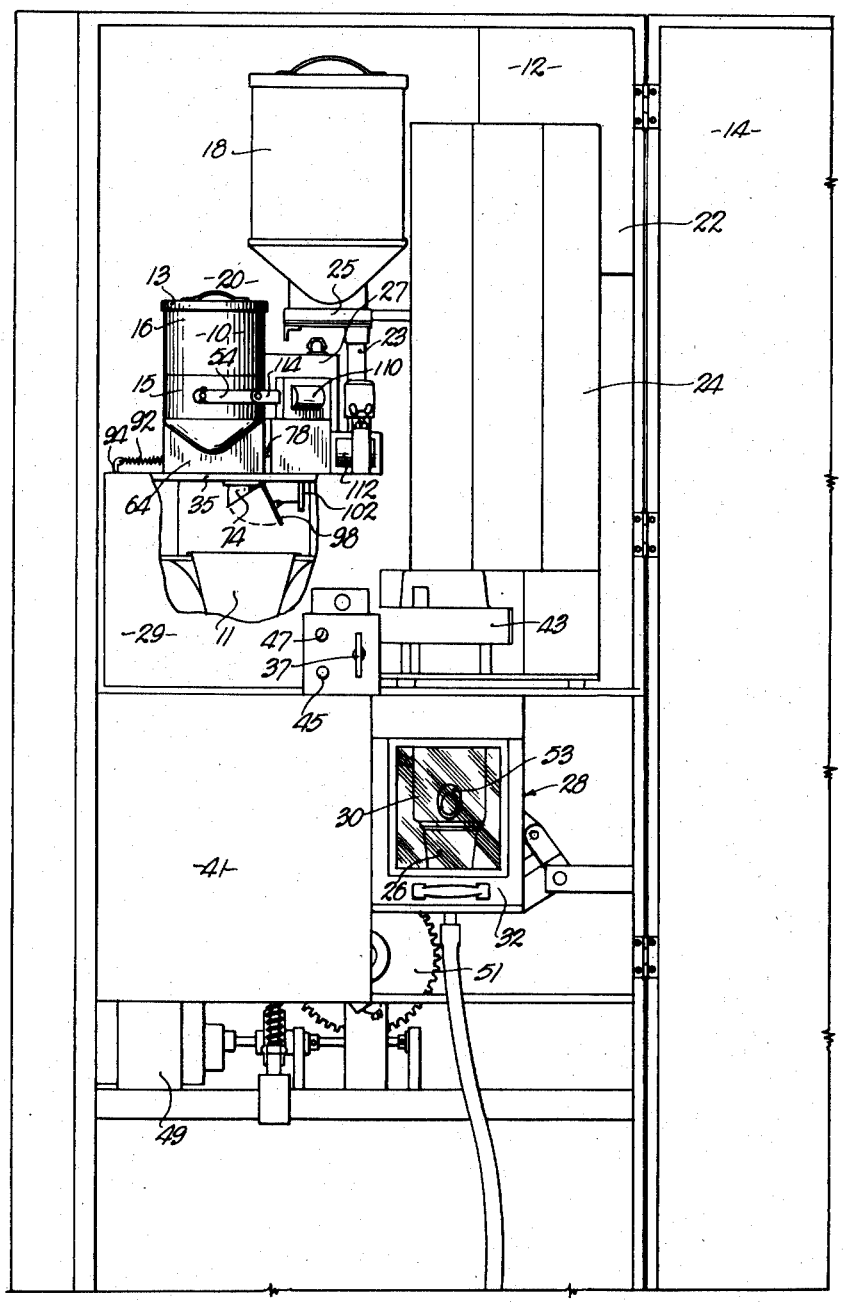
Fig. 1 is an elevational view showing an automatic coffee making and dispensing machine with the main access door thereof open and including an elevational view of a cream dispensing apparatus made in accordance with my present invention.

Figure 1 of the drawings shows the entire machine, taking much the same form as the disclosure of said patent. The cream dispenser forming the subject matter hereof is also shown in elevation in Fig. 1 and is broadly designated by the numeral 20.

It is noted in Fig. 1 that there is provided a hollow cabinet 12 having an open door 14 hingedly secured thereto and that said cabinet is provided with a horizontal partition 35. It is upon this partition 35 that the cream dispensing assembly shown in Figs. 2 to 5 inclusive, is mounted. Fig. 1 also illustrates a container 18 for coffee grounds, and a water container 22.

One way in which the coffee grounds may be dispensed in measured quantities into a transfer cup through a conduit 23 and by means of a valve in housing 25, is adequately set forth in the aforesaid patent and need not be repeated herein.

Water from container 22 is heated in a boiler 27 and may also be delivered into said transfer cup in measured quantities as disclosed in said patent, the movable transfer cups being in a compartment 29.

There is provided a compartment 24 for storing a plurality of cups 26 in stacked rows for delivery automatically and singly into a receiving chamber 28, by means of mechanism 43, through a tube 30.

The brewed coffee from the transfer cups, and cream, if desired, are fed into a funnel 11 and thence into cup 26 by way of a spout 39. A transparent gate 32 is actuated by the customer to render cup 26 accessible. The coffee grounds are separated from the liquid before delivery to spout 39 by strainer mechanism in compartment 41, and such mechanism forms the subject matter of my co-pending application Serial No. 116,541, filed on even date herewith, entitled "Coffee Making and Dispensing Machine."

A pair of customer-actuated switches 45 and 47, initiate cycles of operation to deliver black coffee or coffee with cream respectively to cup 26 by energization of electric motor 49 and operation of mechanism including main gear 51 together with structure outlined in detail in said patent.

Sugar dispensing means (not shown) is operated by the customer through pulling on handle 37, whereby to feed cubes of sugar to cup 26 by way of a conduit having an outlet 53 in register with chamber 28. Such means forms the subject matter of my co-pending application Serial No. 116,542, filed on even date herewith and entitled "Sugar Dispensing Apparatus for Coffee Making and Dispensing Machines."

Figure 2:
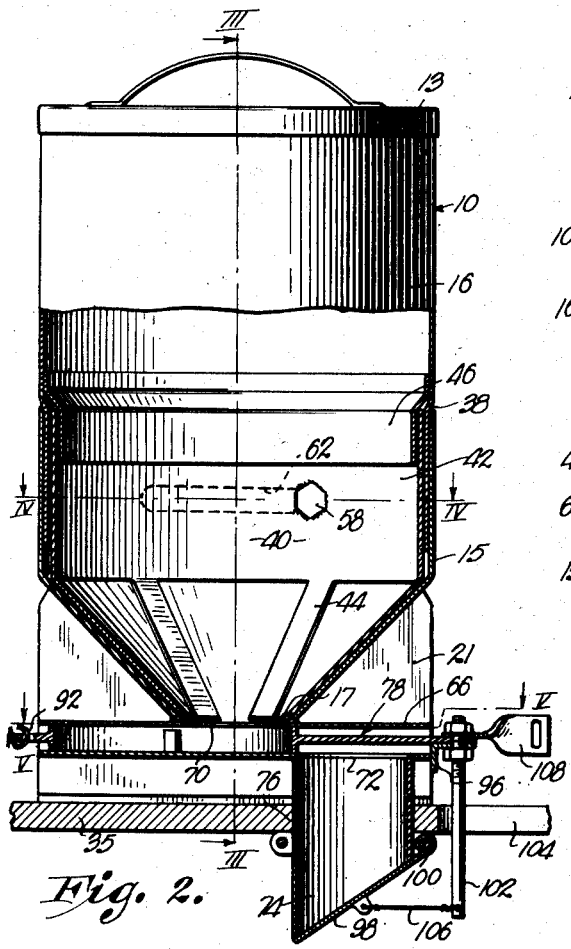
Fig. 2 is an enlarged, elevational view of the cream dispensing apparatus per se, parts being broken away and in section to reveal details of construction.
Figure 3:
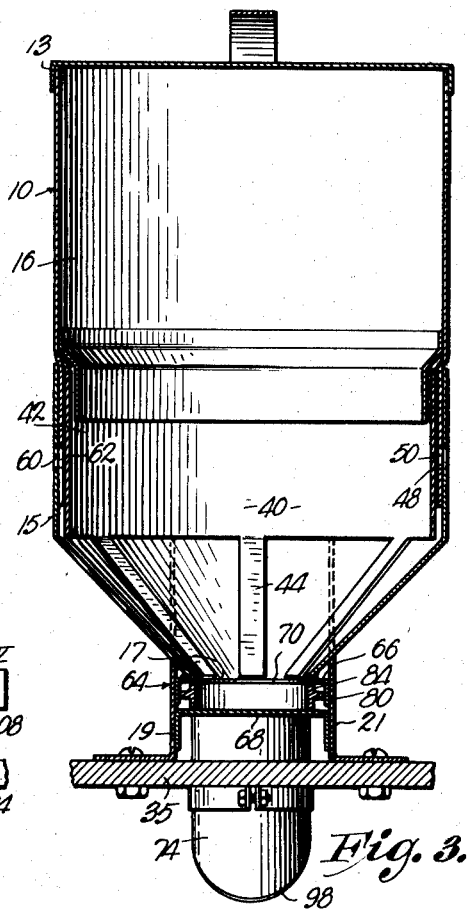
Fig. 3 is a substantially central, vertical, cross-sectional view taken on line III—III of Fig. 2, looking in the direction of the arrows.
Figure 4:
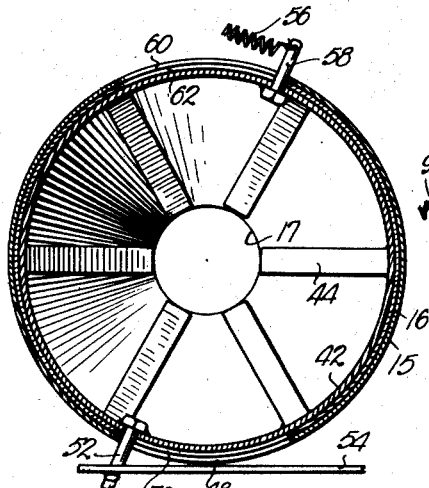
Fig. 4 is a transverse, cross-sectional view taken on line IV—IV of Fig. 2, looking in the direction of the arrows.
Figure 5:
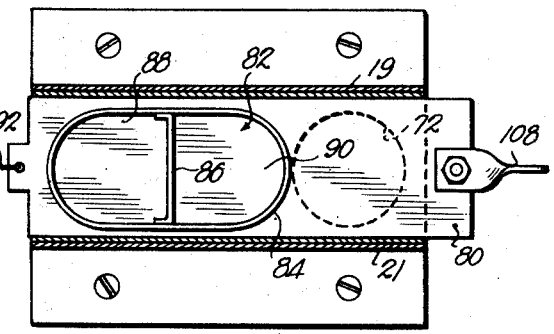
Fig. 5 is a transverse, cross-sectional view taken on irregular line V—V of Fig. 2, looking in the direction of the arrows.

The cream dispensing apparatus 20 is best illustrated in Figs. 2 to 5 inclusive, and includes a container 10 that is preferably circular in cross-section as shown in Fig. 4, and provided with an open top that is normally covered by a lid 13. Container 10 includes an open top funnel section 15 and a tubular section 16. Funnel section 15 has an outlet opening 17 at the lowermost end thereof and is supported upon the horizontal partition 35 through the medium of a pair of spaced brackets 19 and 21.

The lowermost end of the tubular section 16 is slidably telescoped within the uppermost end of the funnel section 15 and is limited in downward movement by an external, annular shoulder 38. An agitator, broadly designated by the numeral 40 is mounted for oscillation within the container 10. Agitator 40 includes a tubular portion 42 open at its top and bottom and a plurality of blades 44 extending downwardly from the lowermost edge of tube 42. The blades 44 are spaced apart and converge as the lowermost ends thereof are approached, the agitator 40 thereby taking much the same shape as the funnel portion 15 of container 10.

It is seen that the outside diameter of tube 42 is less than the inside diameter of that portion of container section 16 within container section 15 and that the same is telescoped therein for free movement. The blades 44 are in close sliding engagement with the innermost faces of the inclined walls of funnel section 15. Consequently, as agitator 40 is caused to oscillate, the sides of the funnel section 15 adjacent the outlet opening 17 will be continually scraped and kept free of coating by the material within container 10.

An apron 46 secured within the section 16 extends downwardly into telescoping relationship within the tube 42 of agitator 40. The container section 15 and the tubular portion 42 of agitator 40 are provided with registering elongated slots 48 and 50 respectively, for slidably receiving and clearing a pin 52 secured to the tubular portion 42 of agitator 40 and extending outwardly through slots 48 and 50, as most clearly shown in Fig. 4. The outermost end of pin 52 has an actuating link 54 secured thereto.

The agitator 40 is yieldably held biased at one end of its path of travel by a coil spring 56 having one end thereof fixed to a stationary part of the vending machine cabinet (not shown) and the opposite end attached to a pin 58 secured to the drum portion 42 in diametrically opposed relationship to pin 52. A pair of elongated registering slots 60 and 62 in sections 15 and 16 of container 10 respectively, slidably receive the pin 58.

The brackets 19 and 21 are L-shaped having one leg thereof secured to the partition 35 and the other leg extending upwardly in perpendicular relationship to the uppermost face of partition 35. The two spaced, upstanding legs of brackets 19 and 21 are cut away to receive the funnel member 15 and are spaced apart to support a valve casing broadly designated by the numeral 64. Valve casing 64 includes a pair of spaced-apart, horizontal walls 66 and 68, each of which is U-shaped in cross-section as shown in Fig. 3 and each being interposed between the brackets 19 and 21 and secured directly thereto.

The wall 66 has an inlet opening 70 that is in register with the outlet opening 17 of container 10. The lower wall 68 of casing 64 has an outlet opening 72 that is in offset relationship to the openings 17 and 70, all of the openings 17, 70 and 72 being of substantially the same diameter. Opening 72 in valve casing 64 registers directly with an elongated spout 74 that extends downwardly through an opening 76 in partition 35. A valve broadly designated by the numeral 78 is reciprocably mounted for movement longitudinally with respect to the valve casing 64.

Valve 78 in casing 64 constitutes primarily a flat plate 80 having a width substantially the same as the distance between the down-turned legs of wall 66 that is provided with an elliptically-shaped opening 82 intermediate the ends thereof. Opening 82 is defined by a flange 84 having a width substantially the same as the distance between walls 66 and 68. A partition 86 separates the opening 82 into a compartment 88 and a measuring chamber 90.

It is noted, as shown in Fig. 2, that the width of the partition 86 or height thereof is less than that of the flange 84 and, therefore, less than the distance between the proximal faces of wall 66 and 68. Figs. 2 and 3, also, illustrate clearly the way in which the flange 84 extends above and below the plate 80, whereby to hold the latter substantially midway between the walls 66 and 68. As shown in Fig. 2, the measuring compartment 82, having a diameter much the same as the diameter of openings 17 and 70, is normally in alignment with said last-mentioned openings; and, when measuring chamber 82 is in such normal position, the compartment 88 is on one side of the funnel section 15 opposite to the discharge spout 74.

Valve 78 is held biased in such normal position at one end of its reciprocable path of travel by spring 92 secured to one end of the plate 80 adjacent compartment 88 and, also, secured to a fixture 94 on partition 35 (Fig. 1). A stop 96 depending from the plate 80 adjacent that end thereof opposite to spring 92 is disposed to contact the wall 68 as shown in Fig. 2, thereby limiting the extent of movement of the valve 78 toward the fixture 94. The lowermost open end of the discharge spout 74 has a gate 98 hingedly secured thereto as at 100. An elongated pin 102 secured at its uppermost end to the plate 80 adjacent stop 96 extends downwardly through a slot 104 in partition 35 and joins at its lowermost end by means of a flexible cable 106 with the gate 98.

Pin 102 serves not only to hold stop 96 secured to the plate 80 but serves as a means of attachment of an actuating link 108 for the valve 78. In Fig. 1 of the drawings, there is illustrated a pair of solenoids or other electromagnetic elements 110 and 112 serving as prime movers for agitator 40 and valve 78 respectively. Solenoid 110 has its armature connected with link 54 by an arm 114, and the solenoid 112 is similarly connected with the link 108 in a suitable manner (not shown). The electrical circuit for causing simultaneous energization of the solenoids 110 and 112 to oscillate the agitator 40 and to reciprocate valve 78 in one direction is of conventional character and, therefore, need not be illustrated or described.

When the coffee brewing and vending machine illustrated in Fig. 1 is to be placed in operation, the container 10 is filled with cream in a powdered form as is readily obtainable on the open market. Such material will immediately fill the measuring chamber 90 and render the cream dispensing apparatus hereof ready for use. Obviously, the machine will be provided with coin controlled means, all of which will start a cycle of operation that may include the discharge of a quantity of cream into the funnel 11 in direct underlying relationship to spout 74. After insertion of a coin, actuation of button 45 will discharge coffee only into funnel 11. But, pushing of button 47 will cause operation of solenoids 110 and 112 to deliver cream as well as the cup of coffee into funnel 11.

Movement of the valve 78 in a direction away from fixture 94 against the action of spring 92 will, in turn, move the powdered cream within chamber 90 along wall 68 until such measured quantity of granular material dumps into the discharge spout 74. Simultaneously with such movement of valve 78, gate 98 will swing to an open position as shown in Fig. 1 as determined by movement of pin 102 with valve 78 away from the spout 74.

After one operation of valve 78 in this manner, the compartment 88 of valve 78 will become filled with the material from container 10, since such compartment 88 will move into registering relationship with openings 17 and 70. Compartment 88 will always remain filled with the powdery material; and, inasmuch as the partition 86 is spaced below the wall 66 and the opening 70, the powder of compartment 89 and the measuring chamber 82 will intermingle until the dumping action takes place. Such powder within the compartment 88 and above the partition 86 will move across the opening 70 and cause an agitation at opening 70 sufficient to prevent jamming or to break up any tendency to clog.

This action of the valve 78, including the compartment 88 and its contained material, as well as the partition 86, will overcome the difficulties heretofore experienced occasioned by dampness of the powdery material and a resultant caking at the openings 17 and 70. This action cooperates with the action of the agitator 40 in maintaining the free flow of material through container 10 into measuring chamber 82 and thence into discharge spout 74. This cooperative action of the agitator 40 is enhanced by the formation of blades 44 and the proximity of the lowermost ends thereof to the outlet opening 17.

The sides of the funnel member 15 immediately above opening 17 will always be kept clean by the scraping action of blades 44 and particularly will coating be prevented adjacent opening 17. From the standpoint of operation, the lowermost ends of blades 44 may extend downwardly as far as desired, assuring only that the same will not interfere with the free reciprocation of valve 78.

Maintaining of the discharge spout 74 in a closed condition when the dispenser is not being used will prevent any tendency of moisture emanating for instance from the steaming coffee passing upwardly through discharge spout 74, through opening 72, into valve casing 64, and thence into the container 10.

It is apparent from the foregoing that there has been provided a dispenser that is adapted to vend measured quantities of granular or powdered material without defective operation, particularly when there is a tendency of the material itself to cake and harden thereby choking the outlet opening of the storage container therefor.

Manifestly, many details of construction and other changes might be made over and above the single embodiment of the invention herein disclosed, and those that fairly come within the scope of the appended claims are contemplated hereby.

Having thus described my invention, what I claim as new and desire to secure by Letters Patent is:

1. In an apparatus for dispensing granular material, the combination with a container having an outlet opening in the bottom thereof, of a valve casing registering with said outlet opening and having a discharge spout disposed in offset relationship to said outlet opening; a hollow valve shiftably mounted in said casing for movement alternately into communication with said outlet opening and said discharge spout as the valve is shifted; and a partition in the valve movable across said outlet opening as the valve is shifted for maintaining said outlet opening free of choking with the material, said partition being spaced below said container, whereby certain of the material below the outlet opening is always in contact with certain of the material above the outlet opening as the valve is shifted.

2. In an apparatus for dispensing granular material, the combination with a container having an outlet opening in the bottom thereof, of a valve casing registering with said outlet opening and having a discharge spout disposed in offset relationship to said outlet opening; a valve shiftably mounted in said casing and provided with a measuring chamber movable alternately into communication with said outlet opening and said discharge spout as the valve is shifted; and a compartment in the valve, separate from said measuring chamber, for receiving a quantity of said material and disposed for movement of the latter across said outlet opening as the valve is shifted to free the outlet opening of choking with said material and means for maintaining said material in the compartment throughout the operation of the apparatus.

3. In an apparatus for dispensing granular material having a container provided with an outlet opening in the bottom thereof, a valve casing registering with said outlet opening and having a discharge spout disposed in offset relationship to said outlet opening, and a valve shiftably mounted in said casing and provided with a measuring chamber movable alternately into communication with said outlet opening and said discharge spout as the valve is shifted; means for preventing choking and consequent retarded flow of said material through said outlet opening into said measuring chamber, said means comprising a material-receiving compartment formed in said valve and movable into and out of registering relationship with said outlet opening as the valve is shifted, there being a partition forming a part of said valve and separating the chamber and the compartment, and means for maintaining said material in the compartment throughout the operation of the apparatus.

4. In an apparatus for dispensing granular material having a container provided with an outlet opening in the bottom thereof, a valve casing registering with said outlet opening and having a discharge spout disposed in offset relationship to said outlet opening, and a valve shiftably mounted in said casing and provided with a measuring chamber movable alternately into communication with said outlet opening and said discharge spout as the valve is shifted; means for preventing choking and consequent retarded flow of said material through said outlet opening into said measuring chamber, said means comprising a material-receiving compartment formed in said valve and movable into and out of registering relationship with said outlet opening as the valve is shifted, there being a partition separating the measuring chamber and said compartment, said partition being spaced below said container, whereby certain of the material below the outlet opening is always in contact with certain of the material above the outlet opening as the valve is shifted.

ERMAL J. LIME.

References Cited in the file of this patent
UNITED STATES PATENTS

| Number | Name | Date |
|--------|------|------|
| 479,982 | Heath | Aug. 2, 1892 |
| 2,207,120 | Greig | July 9, 1940 |
| 2,237,189 | McCormack et al. | Apr. 1, 1941 |
| 2,240,030 | Bobrick et al. | Apr. 29, 1941 |
| 2,314,031 | Colburn | Mar. 16, 1943 |